United States Patent Office 3,580,796
Patented May 25, 1971

---

3,580,796
GLASS LAMINATED BY AN ADHESIVE COMPRISING THE POLYURETHANE RESULTING FROM THE REACTION OF BIS(2-ISOCYANATOETHYL) FUMARATE WITH POLYOLS WITHOUT OTHER ISOCYANATE
Robert M. Hick, Jr., Springfield, and Joseph C. Gould, Norwood, Pa., assignors to E. I. du Pont de Nemours and Company, Wilmington Del.
No Drawing. Filed Mar. 16, 1967, Ser. No. 623,566
Int. Cl. B32b *17/10, 27/40*
U.S. Cl. 161—190                                    7 Claims

ABSTRACT OF THE DISCLOSURE

A composite article is prepared by (a) providing a liquid polyurethane by reacting bis (2-isocyanatoethyl) fumarate with a polymeric polyol component which preferably comprises a triol obtained from propylene oxide and 1,2,6-hexanetriol, and (b) using said polyurethane to coat a layer of glass or acrylic plastic or to bond said layer (e.g., a windshield) to another layer of solid material (e.g., an auto body) with a cured bond which is highly resistant to adhesive failure when the article is exposed to sunlight and outdoor weather for extended periods of time.

---

This invention relates to composite articles obtained by applying a layer of a liquid polymeric composition to a glass or acrylic plastic member, for example before bonding or laminating said member to a body of metal or other solid material. The invention also relates to a polyurethane polymer adapted for use in the manufacture of such articles.

It is known in the art that various industries have a need for composite articles (1) which can be made by applying a layer of a liquid polymeric composition to the surface of a transparent or translucent glass or acrylic plastic member and then solidifying the liquid composition, and (2) in which the solidified layer has satisfactory adhesion to said surface after the article has been exposed to sunlight for an extended period of time. There is particular need for such articles in the manufacture of automobiles and the like wherein the in situ solidified layer of polymeric composition forms an adherent resilient interlayer between the glass or acrylic plastic member (e.g., a windshield) and a structural member of metal or other solid material, and the adherent interlayer retains good bond strength between the members of the composite article when the article is exposed during use to sunlight for long periods of time.

The term "acrylic plastic" herein means a solid polymer selected from the group consisting of poly(alkyl acrylates) and poly(alkyl methacrylates) wherein the alkyl radical contains 1 to 8 carbon atoms.

In a broad sense, the article provided by the present invention (sometimes referred to herein as "the composite article") comprises (A) a layer of glass or acrylic plastic, and
(B) in adherent superposed contact with (A), a polymeric layer having as the prinicipal polymer component a polyurethane polymer which is the product of reacting bis(2-isocyanatoethyl)fumarate with a polymeric polyol.

In some of the most beneficial embodiments of the invention, component A is "substantially transparent"; this means it is either transparent or translucent.

The composite article preferably also comprises, as a third component (component C) in adherent superposed contact with component B, a layer of a solid material, for example a ceramic material, cement composition, metal, glass, leather, wood or plastic. It is often advisable to coat component C, prior to formation of the laminated article, with an adherent layer of a protective coating composition adapted for good adhesion to component B.

In one very useful embodiment of the composite article, component A is a glass automobile windshield; the polyurethane of component B is a cured polyurethane elastomer; component C is the windshield-receiving member of an automobile body; and component B is in the form of a narrow strip or bead in interposed adherence with C and the periphery of A. Also, there is preferably a very thin layer of an adhesion-enhancing organic silicon compound (e.g., a silane compound) in interposed adherence with components A and B, said layer having been formed, for example, by applying a primer coat of the silane compound dispersed in a volatile liquid to the portion of the windshield which will be in contact with component B. Among the useful adhesion-enhancing compounds are gama-aminopropyl-triethoxysilane and -trimethoxysilane, N,N' - bis(hydroxyethyl) - gamma-aminopropyl-triethoxysilane, beta-(3,4-epoxy-cyclohexyl)-ethyl-trimethoxysilane and gamma-glycidoxy-propyl-trimethoxysilane. The windshield-receiving member is preferably a steel member which has been coated with an adherent layer of protective coating composition. For example, the steel member can be treated in zinc phosphate chemical coating bath, primed, and coated with a synthetic resin coating composition in accordance with known methods of applying protective coatings to steel automobile bodies; and then coated with a thin layer of a coating composition adapted to enhance the adhesion of component B. The coated surface can, of course, be sanded to provide further improvement in the adhesion of component B.

In the composite article described in the previous paragraph, component B can be in the form of a cured calking composition, for example a composition which was prepared prior to the curing step by blending the liquid polyurethane with a suitable known bodying or thickening (e.g., finely-divided silica) in an amount sufficient to provide a relatively viscous composition, followed by extruding or spreading the composition onto either or both of the members to be bonded. Component B can also have the structure resulting from impregnating a porous absorbent member with a liquid polyurethane polymer and curing the polymer in situ after B is placed in interposed contact with members A and C. The porous member is preferably an open-cell polyurethane foam or a low-density nonwoven fabric.

A porous member is selected which has not only the resilience needed for the particular application, but also the capacity to be impregnated with enough of the liquid polyurethane composition so that members A and C are sealingly bonded together with satisfactory bond strength upon completion of the bonding operation. One very useful porous member is a nonwoven fabric which is made of synthetic fibers, e.g., polyester fibers, and has a density of less than 3, preferably less than 1.5 pounds per cubic foot. Another very useful porous member is an open-cell polyurethane foam having a density of about 1.5–3.0 pounds per cubic foot, for example a foam prepared according to the teachings of U.S. Pats. 3,025,200, 3,171,820 and 3,210,300.

Useful polyurethane polymers for the preparation of component B can be made by reacting bis(2-isocyanatoethyl)fumarate with one or more polymeric polyols, including those polyols known to be useful for the preparation of polyurethanes.

An especially useful polyurethane polymer for the preparation of component B in the practice of this invention is a novel polymer obtained by reacting ($x$) bis(2-isocyanatoethyl)fumarate with ($y$) at least one member of the group consisting of polyalkyleneether glycols, hydroxyl-terminated polyaliphatic hydrocarbons and polyesters containing a plurality of hydroxyl groups, and ($z$) a triol having a molecular weight of about 700–7500 and a hydroxyl value of about 20–240; particularly preferred is such a polymer wherein the triol has an average molecular weight of about 4500–7500 and a hydroxyl value of about 20–40, said triol being the product of condensing about 75–125 moles of propylene oxide with about one mole of 1,2,6-hexanetriol; and the $x:y:z$ molar ratio is within the range of about 60:30:10 to about 75:20:5.

The polyurethane layer (B) of the composite article is prepared from a liquid polyurethane composition which is capable of being converted (cured) to a substantially solid (non-liquid) polyurethane material after being applied to the layer or layers to be coated or laminated. The liquid polyurethane can be (a) an isocyanate-terminated polyurethane capable of reacting with water vapor in the air to form a solid polymer, or (b) a mixture of an isocyanate-terminated polyurethane and a compound having a plurality of groups bearing active hydrogen atoms which groups are capable of reacting with isocyanate groups to form a solid polymer. Among the useful active hydrogen-containing compounds are low molecular weight polyols, organic diamines and mixtures thereof. The isocyanate groups of the isocyanate-terminated polyurethane can be derived from bis(2-isocyanatoethyl) fumarate alone, or a mixture thereof with up to about 50% (by weight of the mixture), preferably less than 10%, of one or more compounds selected from the organic polyisocyanates known to be useful for the preparation of polyurethane polymers. The polyurethane polymer can be prepared according to the general teaching of U.S. Pat. 2,984,645, column 5, line 26 to column 7, line 45; the disclosure of this patent, which issued May 16, 1961 to G. K. Hoeschele, is incorporated herein by reference. Catalysts, coloring agents, viscosity-controlling agents, stabilizers, adhesion-enhancing agents and other additives known to be useful in liquid polyurethane compositions can be added to the liquid composition.

The liquid polyurethane-containing layer is kept in intimate contact with component A, or components A and C, while the liquid polyurethane composition is allowed to undergo the in situ solidification reaction which converts it to a substantially solid polymer. The assembly can be placed under moderate pressure during the solidification reaction if desired; however, good bonds are usually obtained when no pressure is applied to the assembly.

Composite articles are obtainable in accordance with the present invention wherein the solidified polyurethane polymeric layer has a surprisingly strong bond to the other layer or layers of the composite article after the article has been exposed to sunlight and/or to high humidity for long periods of time. Thus, a composite article can be provided according to the invention wherein the top layer is a transparent layer of glass and the bottom layer is a layer of steel, and the polyurethane bonded article can be exposed in an accelerated weathering machine, or outdoors so that the transparent layer of glass faces direct sunlight, for an extended period of time without having the bond strength between the layers of the article become unsatisfactory. This is unexpectedly true even when no highly pigmented opaque primer has been applied to the glass surface to reduce the amount of light hitting the bonding layer, and no stabilizer compound has been added to the polyurethane polymer to improve its resistance to decomposition by ultraviolet light.

The examples which follow are given for the purpose of illustrating the invention. All quantities shown are on a weight basis unless otherwise indicated.

EXAMPLE 1

An automobile windshield made of ¼-inch thick safety glass is resiliently and sealingly bonded to the steel windshield-receiving member of an automobile body as follows.

A resilient bonding layer is prepared by impregnating a strip of open-cell polyurethane foam with a liquid polyurethane composition. The polyurethane foam contains about 45 cells per lineal inch, is resilient and elastic, has a skeletal structure and a density of 1.8 pounds per cubic foot; it is prepared substantially in accordance with the procedure described in U.S. Pat. 3,025,200, Example 7.

The polyurethane foam is impregnated with a liquid polyurethane composition prepared by (a) charging a reaction vessel (equipped with stirrer, thermometer, reflux condenser and nitrogen inlet) with 3110 parts polypropylene glycol (molecular weight 2000), 650 parts petroleum naphtha (boiling range of 88–120° C.), 180 parts carbon black and 3080 parts finely divided calcium carbonate; (b) stirring the contents of the vessel while heating to reflux temperature and continuing to stir at this temperature for two hours; (c) removing all of the petroleum naphtha along with any water present in the vessel by distillation; (d) cooling the mixture to 90° C.; (e) adding 790 parts of bis(2-isocyanatoethyl) fumarate and stirring the mixture for 5 minutes; (f) adding 0.25 part stannous octoate and stirring the mixture at 100° C. for 45 minutes; and (g) adding 1550 parts of a triol having an average molecular weight of about 6000 and a hydroxyl value of 28 prepared by condensing about 100 moles of propylene oxide with one mole of 1,2,6-hexanetriol, and stirring the resulting mixture at 100° C. for two hours.

A 20-foot-long strip of the polyurethane foam measuring ¼-inch wide and ¼-inch thick is (1) passed over a guide roll into a vessel filled with the liquid polyurethane composition at 25° C., (2) passed between a pair of squeeze rolls mounted within the vessel of liquid polyurethane, and (3) passed from the vessel over a guide roll and onto a wire mesh conveyor belt. The resulting impregnated polyurethane foam has a weight ratio of liquid polyurethane composition to polyurethane foam of 96.8/3.2. The cells of the polyurethane foam are substantially completely filled with the liquid composition.

The peripheral portion of the windshield surface which will be in contact with the bonding layer is prepared in advance of the impregnation operation by (a) washing it with a composition consisting of 3 parts isopropanol, 3 parts Butyl Carbitol and 94 parts water and wiping it with a clean, dry cloth; (b) wiping it with a clean cheese cloth wet with an adhesion-enhancing primer consisting of a 2% solution in ethanol of gamma-aminopropyl-triethoxysilane; and (c) allowing the primer to dry for 15 minutes at 25° C.

The portion of the windshield-receiving member which will be in contact with the bonding layer is prepared before the foam impregnation by (1) applying a zinc phosphate coating ("Bonderite" 100), (2) spraying on a 0.001-inch thick coat (dry film thickness) of a primer having the composition given under Formula A below and baking it for 30 minutes at 196° C., (3) spraying on a 0.025-inch thick coat (dry film thickness) of a known automobile enamel (as described in Example 10 of U.S. Pat. 2,934,509) and baking it for 30 minutes at 135° C., and (4) brushing on a coat of adhesion enhancing primer having the composition given under Formula B below and allowing it to dry for 30 minutes at 25° C.

Formula A

| | Parts |
|---|---|
| Alkyd resin solution | 18.0 |
| Urea formaldehyde resin, 60% solution in butanol | 2.0 |
| Iron oxide | 11.5 |
| Aluminum silicate | 9.0 |
| Barytes | 28.8 |
| Aromatic solvent B.P. 190–210° C. | 16.0 |
| Aliphatic solvent B.P. 190–250° C. | 14.7 |
| | 100.0 |

In Formula A, the alkyd resin is a 40% oil-length dehydrated castor oil modified glyceryl-ethylene glycol phthalate alkyd resin having an acid number of about 8 and a content of unesterified hydroxyl groups equivalent to 4.1% glycerol; this resin is added as a 55% solution in xylene having a Gardner-Holdt viscosity of Y.

Formula B

| | Parts |
|---|---|
| Methylmethacrylate hydroxyaminopropyl resin made as described in Example 1 of U.S. Pat. 2,949,445, added as a 30% solution in a 56/44 blend of toluene and isopropanol | 45.0 |
| Polymethylmethacrylate, 40% solution in a 33/67 blend of acetone and toluene | 5.5 |
| Acrylic resin/carbon black dispersion [1] | 12.3 |
| Xylene | 30.1 |
| Cellosolve acetate | 0.3 |
| Butyl benzyl phthalate | 6.8 |
| | 100.0 |

[1] Prepared by mixing 35 parts xylene, 50 parts polymethylmethacrylate, 10 parts carbon black, grinding the mixture thoroughly in a ball mill and adding 5 parts xylene.

The bonding operation is completed by (1) placing the strip of impregnated polyurethane foam described above in contact with the primed periphery of the windshield and fitting the strip to cover the entire periphery, (2) mounting the resulting assembly in place on the steel windshield-receiving member so that the impregnated foam strip is in interposed contact with the entire periphery of the windshield and the steel member, (3) keeping the layers of the assembly in intimate contact with each other while the liquid polyurethane composition is solidified in situ by allowing the assembly to stand for 24 hours at an ambient temperature of 30° C. and a relative humidity of 71% whereby the liquid polyurethane reacts with the moisture in the atmosphere and is converted to a solid polyurethane elastomer. The strength of the bond continues to increase (i.e., the bond continues to cure) for the next few days as the assembly stands at ordinary ambient temperature and humidity (e.g., 25° C. and 50% relative humidity).

The windshield is now integrally bonded to the steel member. The bond has satisfactory strength, resilience and imperviousness to fluids and dust when the automobile is subjected to normal use conditions; and the bond has excellent retention of bond strength on extended outdoor exposure of the automobile.

EXAMPLE 2

A lap joint is prepared as follows for testing properties of a bond obtained between glass and steel articles in accordance with the invention:

(1) A sheet of plate glass having a thickness of ¼ inch, a width of 1 inch and a length of 4 inches is cleaned and primed on one side as the windshield was in Example 1.

(2) A sheet of auto body steel having a thickness of 1/16 inch, a width of 1 inch and a length of 4 inches is zinc phosphate coated, primed and painted on one side as the steel member was in Example 1.

(3) The glass sheet is placed primed-side-up on a bench top and the metal sheet is placed painted-side-down so that part of it is in superposed contact with the glass sheet and so that there is a ½-inch end-to-end overlap of the two sheets.

(4) A resilient bonding layer measuring 1 inch long, ½ inch wide and ¼ inch thick is prepared as described in Example 1 except the polyurethane foam contains about 30 cells per lineal inch, and in preparing the liquid polyurethane composition, the carbon black and calcium carbonate are omitted; and after step (g), 87 parts of the liquid polyurethane composition are mixed with 13 parts of petroleum naphtha (B.R. 88–120° C.) to provide a composition having a content of nonvolatile material of about 87%.

(5) The impregnated foam strip is placed in interposed contact with the overlapped portions of the two sheets so that one edge of the foam strip lies in the same verticle plane as the overlapped end of the metal sheet.

(6) The layers of the assembly are kept in intimate contact with each other while the liquid polyurethane composition is solidified in situ by allowing the assembly to stand for 24 hours at 38° C. and 100% relative humidity.

The resulting lap joint is tested on an Instron Tensile Test Machine at a chart speed of 10 inches per minute and a crosshead speed of 1 inch per minute using a full scale load of 100 pounds on the "D" cell. The direction of force is parallel to the longest side of the test assembly. As shown in Table 1 below (Sample 2.1), the bond has a lap shear value of 82 p.s.i. and an elongation at break of 200%.

The bonded assembly is placed in a conventional accelerated weathering machine wherein the assembly is subjected intermittently to a spray of water and to the actinic light of a sunlamp. The glass surface of the assembly faces the sunlamp. The assembly remains in the weathering machine for an extended period of time until it has been subjected to 1200 langleys (ultraviolet radiation); a langley is a unit of solar radiation equal to one gram calorie per square centimeter of irradiated surface. Then the bond is tested again as described above (Instron Test); the test results are shown in Table 1, Sample 2.2. The breakage occurs within the layer of polyurethane adhesive (cohesive failure); it is surprising and beneficial that there is no breakage at the glass/polyurethane interface. The polyurethane adhesive remains strongly bonded to both the glass and metal surfaces. Unexpectedly, the accelerated weathering does not render the bond strength unsatisfactory.

EXAMPLE 2A

For purposes of comparison a lap joint outside the scope of the present invention is prepared and tested as described in Example 2 except (1) in preparing the liquid polyurethane composition, the bis(2 - isocyanatoethyl) fumarate is replaced with an equal number of moles of bis(2-isocyanatoethyl)carbonate, and (2) the bond is subjected to only 660 langleys in the weathering machine. The results of the Instron Test before weathering (Sample 2.3) and after weathering (Sample 2.4) are shown in Table 1. The breakage in Sample 2.4 undesirably occurs at the glass/polyurethane interface (adheive failure); and the accelerated weathering with only 660 langleys renders the bond strength unsatisfactory. (In Table 1, PU means polyurethane).

TABLE 1.—INSTRON TEST

| | Lap shear, p.s.i. | Percent elongation | Breakage at glass/PU interface? |
|---|---|---|---|
| Sample No.: | | | |
| 2.1 | 82 | 200 | No. |
| 2.2 | 68 | 177 | No. |
| 2.3 | 39 | 212 | No. |
| 2.4 | 14 | 110 | Yes. |
| 3.1 | 66 | 275 | No. |
| 3.2 | 36 | 220 | No. |

When Example 2A is repeated except the bis(2-isocyanatoethyl)carbonate is replaced with an equal number of moles of bis(iscyanatophenyl)methane (also sometimes referred to in the art as 4,4'-diphenylmethanediisocyanate), again the breakage in the bond after the weather test of only 660 langleys undesirably occurs at the glass/polyurethane interface (adhesive failure).

EXAMPLE 3

A lap joint is prepared and tested as described in Example 2 except the bonding layer is provided by (a) mixing 87 parts of the liquid polyurethane composition described in Example 1 with 13 parts of petroleum naphtha (B.R. 88–120° C.), (b) mixing 94 parts of the resulting polyurethane/naphtha mixture with 6 parts of pyrogenic silica having an average particle size of about 0.01 micron ("Cabosil" M–5), (c) extruding a bead of the resulting viscous liquid polyurethane adhesive measuring 1 inch long, ½ inch wide and ¼ inch thick onto the glass sheet and (d) placing the metal sheet in position as indicated in Example 2.

The results of the Instron Test before weathering (Sample 3.1) and after weathering (Sample 3.2) are shown above in Table 1. It is therefore apparent that the bond not only is resistant to adhesive failure but also still has satisfactory strength for many applications after being subjected to the extended exposure of 1200 langleys in the weathering machine.

We claim:
1. A composite article comprising
   (A) a layer of glass or acrylic plastic, and
   (B) in adherent superposed contact with (A), a polymeric layer of a polyurethane polymer which is the product of reacting bis(2-isocyanatoethyl)-fumarate with a polymeric polyol and substantially no additional isocyanates.
2. An article according to claim 1 wherein (A) is substantially transparent.
3. An article according to claim 2 which also comprises
   (C) in adherent superposed contact with (B), a layer of solid material from the group consisting of metal, glass, wood, plastic, leather, cement compositions and ceramics.
4. An article according to claim 3 wherein (A) is a glass automobile windshield, the polyurethane of (B) is a cured polyurethane elastomer, (C) is the windshield-receiving member of an automobile body, and (B) is in the form of a narrow strip in interposed adherence with (C) and the periphery of (A).
5. An article according to claim 4 wherein there is a very thin layer of an adhesion-enhancing silane compound in interposed adherence with A and B.
6. An article according to claim 4 wherein said windshield-receiving member is a steel member coated with an adherent layer of coating composition adapted to adhere to component (B).
7. An article according to claim 4 wherein (B) is in the form of a cured calking composition containing a finely-divided bodying agent.

References Cited

UNITED STATES PATENTS

| | | | |
|---|---|---|---|
| 2,964,424 | 12/1960 | Mast | 117—98 |
| 2,984,645 | 5/1961 | Hoeschele | 260—45.9X |
| 3,193,426 | 7/1965 | Schafer | 161—190X |
| 3,155,422 | 11/1964 | Campbell et al. | 296—93 |
| 3,233,025 | 2/1966 | Frye et al. | 264—176 |
| 3,387,416 | 6/1968 | Martin | 52—403X |
| 3,415,701 | 12/1968 | Haldane et al. | 161—190X |
| 3,445,423 | 5/1969 | Sunshine et al. | 161—190X |
| 3,422,165 | 1/1969 | Brotherton et al. | 161—190X |
| 3,450,653 | 6/1969 | McClellan | 260—77.5AT |
| 3,505,252 | 4/1970 | Brotherton et al. | 161—190X |

FOREIGN PATENTS 761,426  11/1956  Great Britain _____ 161—190AX

JOHN T. GOOLKASIAN, Primary Examiner

C. B. COSBY, Assistant Examiner

U.S. Cl. X.R.

52—208; 161—100; 156—99; 260—2.5, 77.5; 296—93